US012605869B2

(12) United States Patent
Drammeh et al.

(10) Patent No.: US 12,605,869 B2
(45) Date of Patent: Apr. 21, 2026

(54) METHOD AND APPARATUS FOR ADJUSTING RECESS DEPTH OF A MOLD INSERT

(71) Applicant: Essilor International, Charenton-le-pont (FR)

(72) Inventors: Ahmed Drammeh, Arlington, MA (US); Zbigniew Tokarski, Woodstock, CT (US)

(73) Assignee: Essilor International, Charenton-le-Pont (FR)

( * ) Notice: Subject to any disclaimer, the term of this patent is extended or adjusted under 35 U.S.C. 154(b) by 167 days.

(21) Appl. No.: 18/287,398

(22) PCT Filed: Apr. 14, 2022

(86) PCT No.: PCT/EP2022/060138
§ 371 (c)(1),
(2) Date: Oct. 18, 2023

(87) PCT Pub. No.: WO2022/223475
PCT Pub. Date: Oct. 27, 2022

(65) Prior Publication Data
US 2024/0198568 A1      Jun. 20, 2024

(30) Foreign Application Priority Data

Apr. 22, 2021    (EP) .................................... 21305531

(51) Int. Cl.
B29D 11/00      (2006.01)
B29C 45/27      (2006.01)
B29L 11/00      (2006.01)
(52) U.S. Cl.
CPC ...... B29C 45/2708 (2013.01); B29D 11/0048 (2013.01); B29L 2011/0016 (2013.01)

(58) Field of Classification Search
CPC ............. B29D 11/0048; B20C 45/2708; B29L 2011/0016
See application file for complete search history.

(56) References Cited

U.S. PATENT DOCUMENTS 7,175,785 B2 *   2/2007   Takeda ................ B29C 37/0032
264/1.32
2003/0164564 A1   9/2003   Klotz
2004/0125335 A1   7/2004   Vu

FOREIGN PATENT DOCUMENTS

EP        3437845        2/2019
EP        3838546        6/2021
(Continued)

OTHER PUBLICATIONS

International Search Report and Written Opinion issued in corresponding PCT Application No. PCT/EP2022/060138, mailed Jun. 8, 2022.

*Primary Examiner* — Mathieu D Vargot
(74) *Attorney, Agent, or Firm* — Norton Rose Fulbright US LLP

(57)        ABSTRACT

A mold device includes a first mold side configured to receive a substrate in a cavity and to couple with a second mold side, the first mold side including a sidewall and a gate, wherein the substrate is recessed in the first mold side at a substrate recess depth of 2 mm or greater, and wherein the substrate recess depth is a distance along the sidewall between a bottom of the gate and a surface of the substrate in a direction perpendicular to a line between the gate and a middle of the surface of the substrate, and wherein the bottom of the gate and a top of the sidewall are at distinct heights from the surface of the substrate.

14 Claims, 10 Drawing Sheets

(56) References Cited

FOREIGN PATENT DOCUMENTS

| JP | S6166623 | 4/1986 |
| WO | WO 2021/111291 | 6/2021 |

* cited by examiner

235

230  225

235

230  225

METHOD AND APPARATUS FOR ADJUSTING RECESS DEPTH OF A MOLD INSERT

CROSS-REFERENCE TO RELATED APPLICATIONS

This application is a national phase application under 35 U.S.C. § 371 of International Application No. PCT/EP2022/060138 filed 14 Apr. 2022, which claims priority to European Patent Application No. 21305531.2 filed 22 Apr. 2021. The entire contents of each of the above-referenced disclosures is specifically incorporated herein by reference without disclaimer.

FIELD

The present disclosure relates to a method and apparatus for the elimination of wafer delamination at or near an injection gate region via adjusting the recess depth of a mold insert for injection over molding of soft laminate layers. In particular, increasing the recess depth of the mold insert in relation to the thickness of the substrate reduces shear stress induced by the geometry of the non-modified mold apparatus.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In the manufacture of curved lenses, injection over molding of myriad wafer substrates comprising temperature sensitive polymers presents many challenges. One such challenge can arise as a result of the high temperature polymer melt as it is injected into the lens mold via the gate, which can be narrow and a source of concentrated stress due to the laminar flow through the narrow gate region and resulting shear induced temperature rise and turbulence as it egresses from the gate and comes into contact with the substrate.

Using a standard wafer molding process with standard conditions, the high melt temperature and shear of the molten polymer resin as it flows past the gate and into the mold cavity can cause a temperature-sensitive functional layer of a multilayer laminate substrate to lose its mechanical and cohesive integrity. This increases the susceptibility of delamination of said layer near the gate, and additional layer material moving radially along the periphery of the wafer. This wafer edge delamination near the gate is commonly referred to as a "gate defect" that can make the resulting lens aesthetically and/or optically unusable. Thus, a method and apparatus for reducing the occurrence of this gate defect is desired.

Aspects of the disclosure may address some of the above-described shortcomings in the art, particularly with the solutions set forth in the claims.

SUMMARY

The present disclosure relates to a mold device, including a first mold side configured to receive a substrate in a cavity and to couple with a second mold side, the first mold side including a sidewall and a gate, wherein the substrate is recessed in the first mold side at a substrate recess depth of 2 mm or greater, and wherein the substrate recess depth is a distance along the sidewall between a bottom of the gate and a surface of the substrate in a direction perpendicular to a line between the gate and a middle of the surface of the substrate, and wherein the bottom of the gate and a top of the sidewall are at distinct heights from the surface of the substrate.

In a useful arrangement, the substrate recess depth is 2.5 mm or greater.

In a useful arrangement, the substrate recess depth is 3 mm or greater.

In a useful arrangement, the substrate recess depth results in a maximum shear stress along the sidewall adjacent to the gate of less than 0.055 MPa The present disclosure additionally relates to a method of forming a lens, including adjusting a cavity surface of a first mold side, the first mold side configured to couple with a second mold side, the first mold side including a cavity, a sidewall, and a gate, the cavity surface being adjusted to a substrate recess depth of 2 mm or greater, the substrate recess depth being a distance along the sidewall between a bottom of the gate and a surface of a substrate in a direction perpendicular to a line between the gate and a middle of the surface of the substrate, the bottom of the gate and a top of the sidewall being at distinct distances from the surface of the substrate; and injecting a polymer into the coupled first mold side and second mold side via the gate.

Note that this summary section does not specify every feature and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein.

DETAILED DESCRIPTION

Figure 1A:
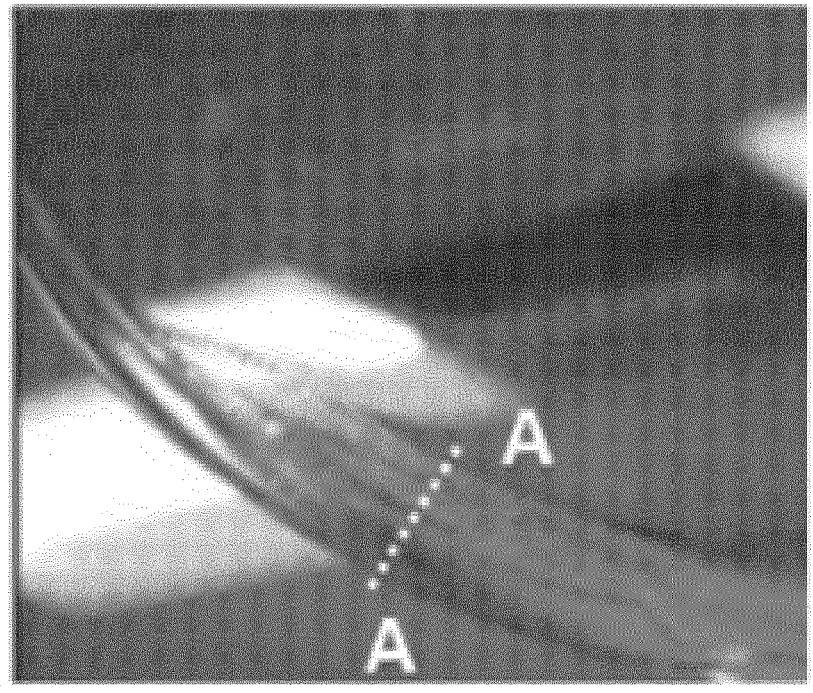
FIG. 1A shows an optical image of a molded lens including a gate defect, within the scope of the present disclosure.

FIG. 1A shows an optical image of a molded lens including a gate defect, useful within the scope of the present disclosure. FIG. 1A highlights the areas where a polymer melt has flowed into a cavity of a mold via a gate, which is attached to the semi-finished (SF) lens (hereinafter referred to simply as the "lens") mold, and caused visible defects to the lens immediately proximal to the gate. As previously described, the high temperature and flow of the polymer melt flowing through the gate and into the mold cavity can cause a temperature-sensitive layer of a multilayer laminate substrate disposed in the mold cavity to delaminate. Here, the result is seen as areas of the lens that are no longer optically transparent and uniform compared to the rest of the lens. Since the source of the defect occurs near the gate, the most impacted portion of the lens is at the gate entrance into the mold cavity and radially along the periphery of the lens near the gate as the polymer melt spreads upon egress from the gate. While a different gate or unique mold design may be able to reduce the stresses imparted by the polymer melt on the laminate substrate during injection, such solutions can require expensive and time-intensive re-tooling of fabrication equipment or new equipment entirely. Thus, a method and apparatus are described herein that reduces said injection over molding induced stresses without the need for new equipment or costly modifications.

In a useful configuration, the laminate substrate can include a functional layer disposed in the laminate substrate, such as in the center of the laminate substrate. The functional layer can be, for example, a thermoplastic polyurethane (TPU), and sandwiched between two outer layers in a 3-ply laminate construction, wherein the outer layers are, for example, polycarbonate, cellulose triacetate, polyacrylate, cyclic olefin copolymer, polyester, polyethylene, among other materials. The functional layer can be attached to the outer layers via an adhesive. It may be appreciated that other arrangements of the functional layer, numbers of layers in the laminate substrate, and methods of attachment can be contemplated. The laminate substrate can have a base curvature and be disposed in the mold also having a base curvature to form the curved lens (but both the lens and mold need not have a base curvature at all for the defect to occur). Notably, some lenses can resist the formation of said defect, such as polar lenses, where the polar laminate construction or its layers may not be heat or shear sensitive during the polar lens molding process. It may be appreciated that the method and apparatus used herein can be applied for even polar lenses in the event a polymer melt or adhesive is used with even higher melt temperatures.

Figure 1B:
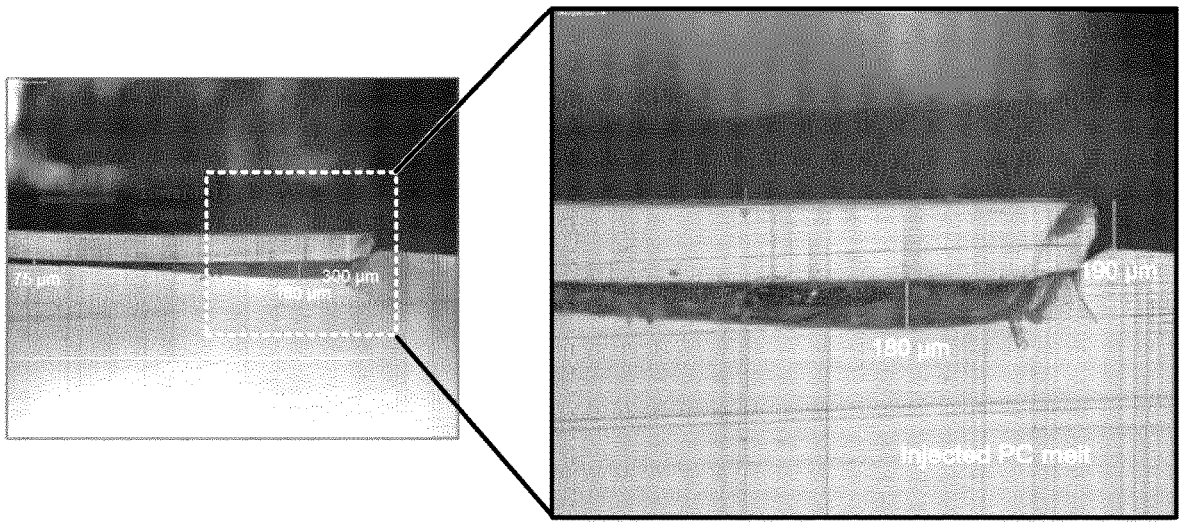
FIG. 1B shows a cross-sectional optical microscopy image of the molded lens including the gate defect along line A-A of FIG. 1A, and a higher magnification zoom of the defective area, within the scope of the present disclosure.

FIG. 1B shows a cross-sectional optical microscopy image of the molded lens including the gate defect along line A-A of FIG. 1A, and a higher magnification zoom of the defective area, useful within the scope of the present disclosure. FIG. 1B highlights a delamination of the wafer, wherein a convex PC layer is separated from the rest of the lens body. The gate defect was observed on 2.25D, 4.25D and 6.50D base lenses (that is, lenses having a base curvature of 2.25, 4.25, and 6.50 diopters). In particular, FIGS. 1A and 1B show the delamination for an injection over molded 4.25D semi-finished lens (SF lens). The mechanical properties, such as the elastic modulus, and cohesiveness of the TPU layer are not resilient enough to withstand the high thermal and shear stresses imparted on the TPU during the injection of the polymer melt, especially near the gate region. To overcome this inherent polymer property, a molding apparatus described herein can be adjusted to increase a recess depth of the inserted substrate, while simultaneously adjusting the positions of the mold sides to compensate for the shifted position of the inserted substrate.

Figure 2A:
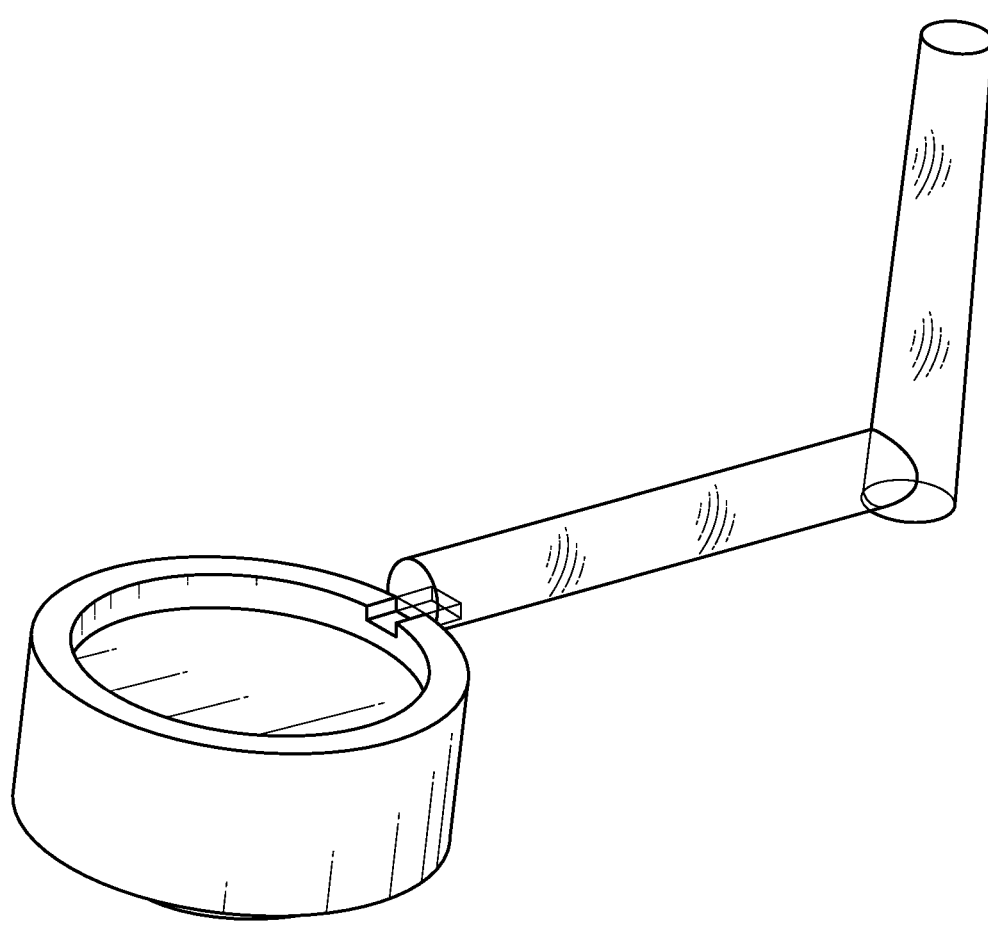
FIG. 2A shows a schematic of a molding apparatus including a runner connected to a mold, within the scope of the present disclosure.

FIG. 2A shows a schematic of a molding apparatus including a runner connected to a mold 200, useful within the scope of the present disclosure. In a useful arrangement, the molding apparatus can include two or more of the molds 200 and the runners 220 connected to a sprue 215 for delivering the polymer melt. Each of the molds 200 can include a first mold side 205 and a second mold side 210, wherein the first mold side 205 and the second mold side 210 are configured to couple for molding the lens. The cylindrical sprue 215, runner 220, and rectangular gate 225 (See FIG. 2B) geometries are for illustrative purposes. Appropriate geometries for the runner 220 may be half-round, full-round, trapezoidal, modified trapezoid, or any geometric combination for the mold 200 design. The appropriate gate 225 geometry may be sprue, pin-point, edge, tab, fan, flash, tunnel, or any other geometry used in the art.

Figure 2B:
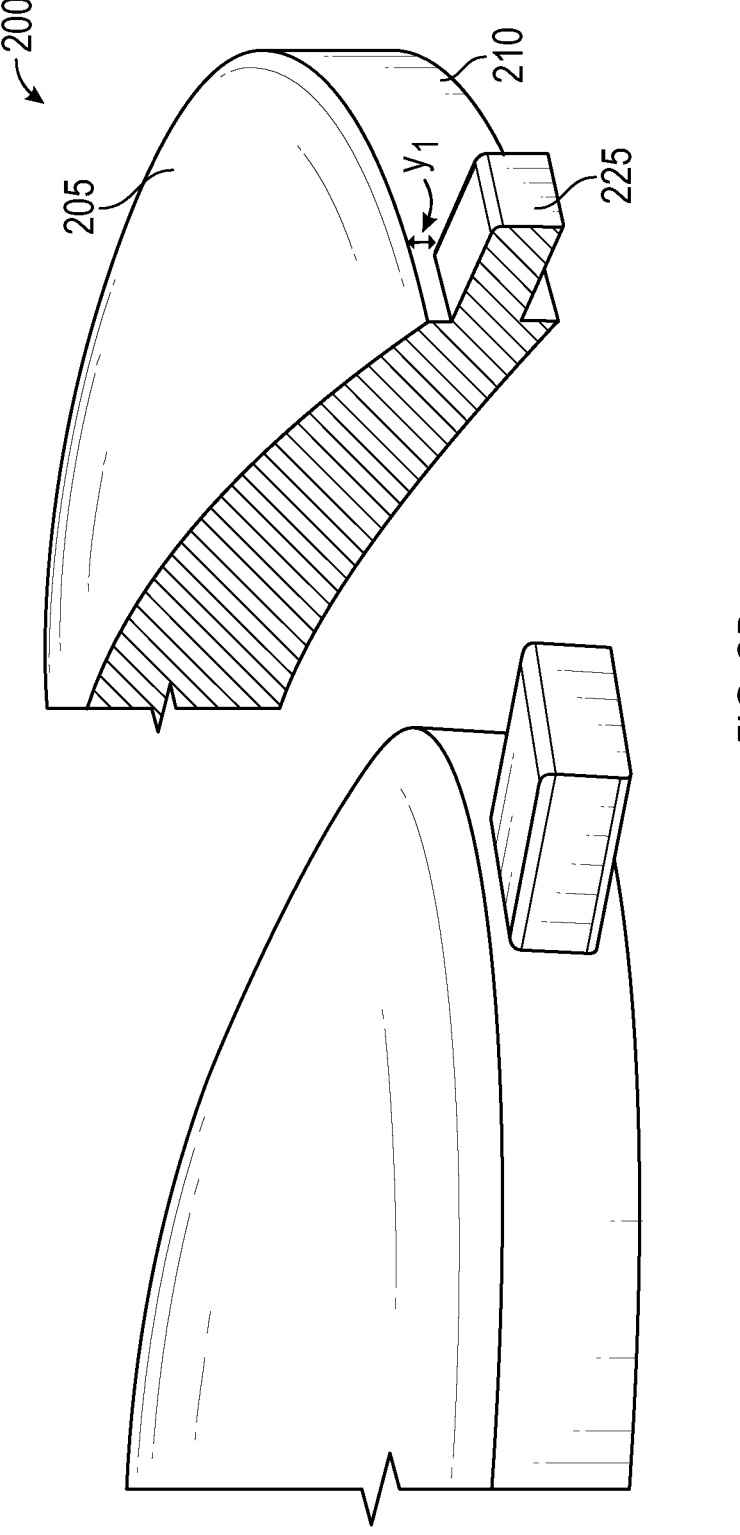
FIG. 2B shows a schematic of the mold including a shallow mold offset, within the scope of the present disclosure.

FIG. 2B shows a schematic of the mold 200 including a shallow mold offset, useful within the scope of the present disclosure. In a useful arrangement, the molding apparatus (shown upside-down) can include a gate 225 attached to the mold 200. Notably, the first mold side 205 can be adjusted to have a predetermined mold offset. As shown in FIG. 2B, the first mold side 205 has a shallow mold offset as denoted by "$y_1$" to indicate a separation from the gate 225. It may be appreciated that the second mold side 210 can include similar features as the first mold side 205.

Figure 2C:
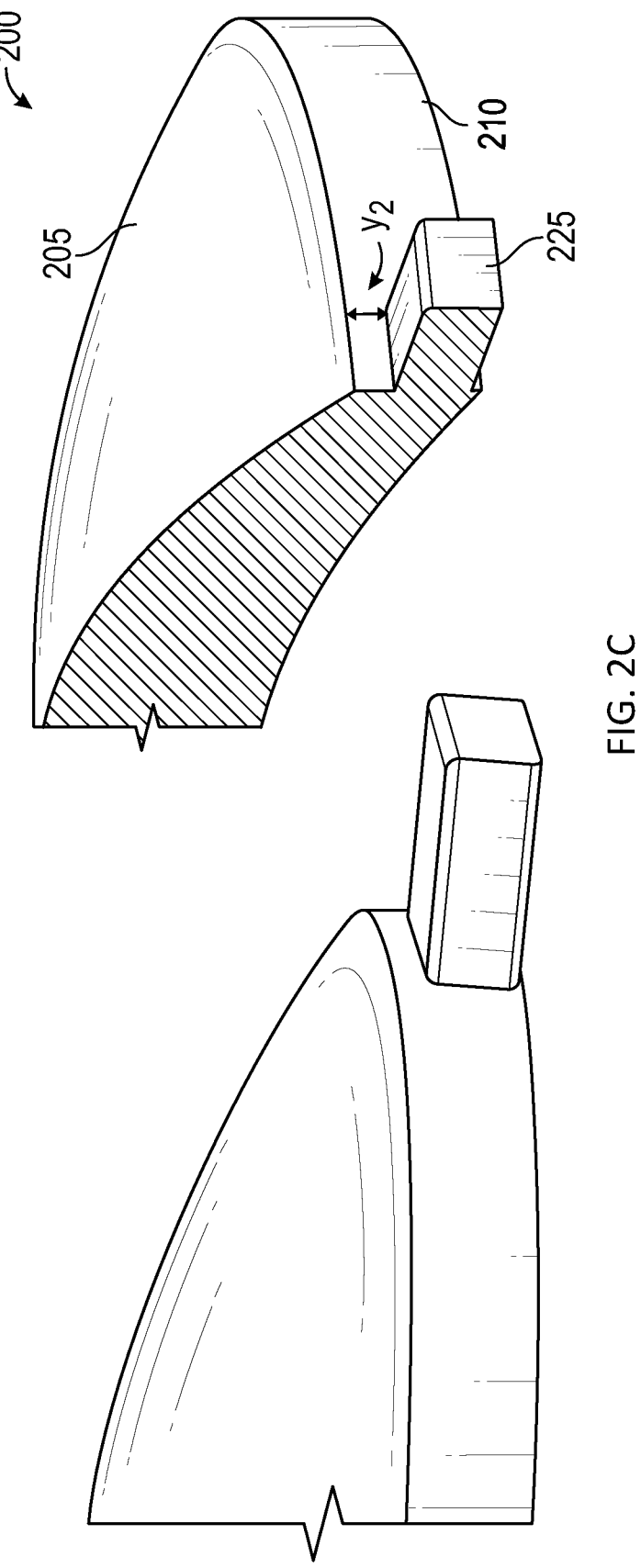
FIG. 2C shows a schematic of the mold including a deep mold offset, within the scope of the present disclosure.

FIG. 2C shows a schematic of the mold 200 including a deep mold offset, useful within the scope of the present disclosure. In a useful arrangement, the first mold side 205 can have a large mold offset, as denoted by "$y_2$" and the larger separation from the gate 225. Adjusting the mold offset can affect a recess depth of the gate 225 between a bottom of the gate 225 and a top of a substrate 240 (see FIG. 3B) inserted in the mold 200. Of course, the substrate 240 can vary in thickness based on a desired resulting lens, and thus the mold offset can help compensate for any thickness of the substrate 240 while maintaining a desired recess depth, "$d_1$" (see FIG. 3C).

Figure 3A:
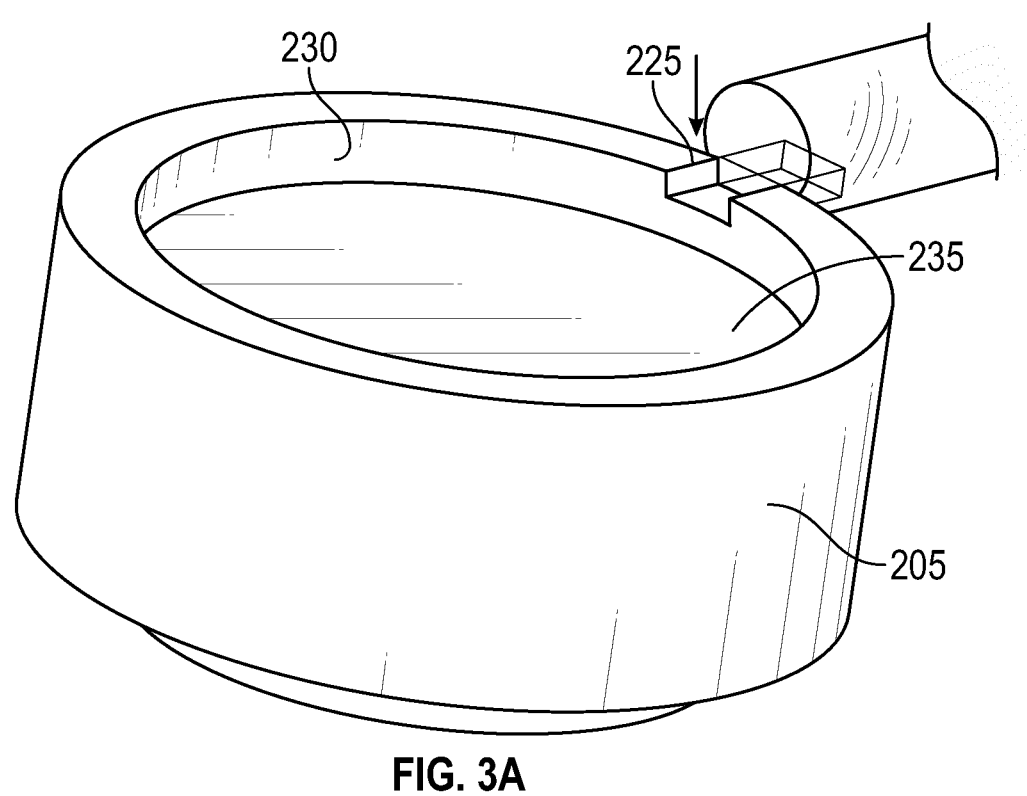
FIG. 3A shows a schematic of the first mold side, within the scope of the present disclosure.
Figure 3B:
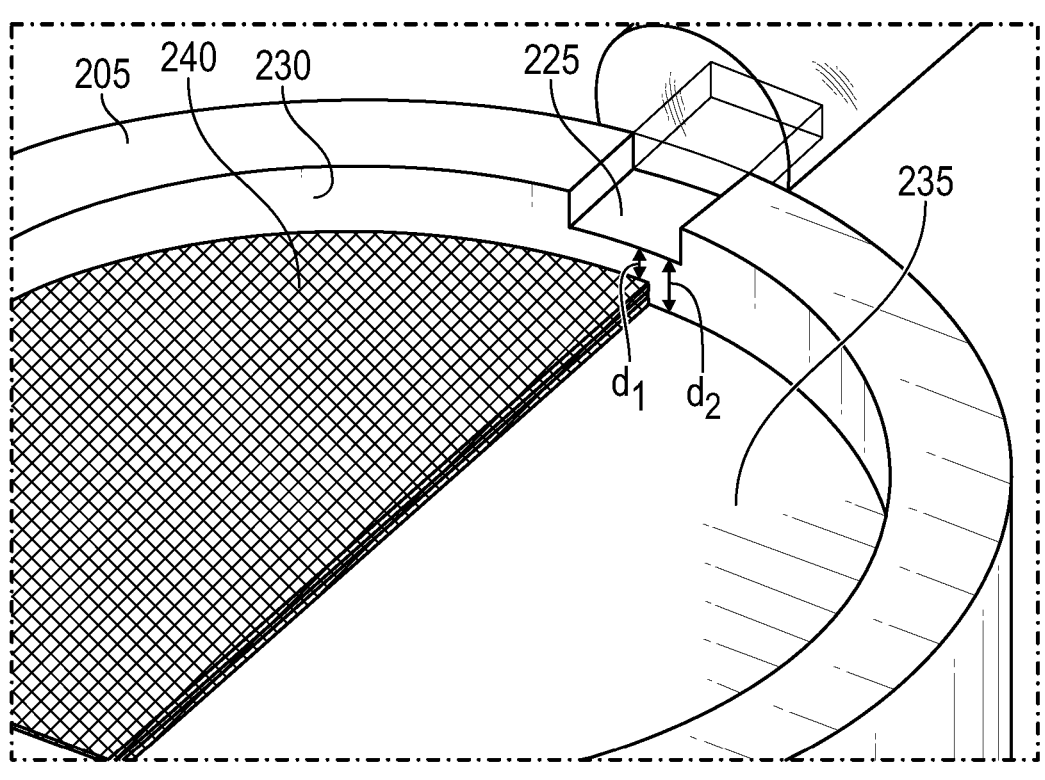
FIG. 3B shows a schematic of the first mold side having the substrate inserted therein, within the scope of the present disclosure.

FIG. 3A shows a schematic of the first mold side 205, useful within the scope of the present disclosure. FIG. 3B shows a schematic of the first mold side 205 having the substrate 240 inserted therein, useful within the scope of the present disclosure. In a useful arrangement, the first mold side 205 includes a cavity at least partially defined by a sidewall 230 and a cavity surface 235. As shown, the gate 225 is partially formed into the sidewall 230 of the first mold side 205, but it may be appreciated that the gate 225 need not be formed into the sidewall 230 of the first mold side 205 at all. For example, the gate 225 can be formed into a part of the second mold side 210 instead. However, referring to FIGS. 3A and 3B, the gate 225 is, in another manner of speaking, cut into the sidewall 230 and itself can include a bottom and sidewalls to direct flow of the polymer melt into the mold 200. In a useful arrangement, the polymer melt can be injected such that varying portions of the polymer melt are directed into each of the first mold side 205 and the second mold side 210. For example, the combined cavities of the first mold side 205 and the second mold side 210 (when the first mold side 205 and the second mold side 210 are coupled) can receive the polymer melt such that approximately 50% of the polymer melt flows into the cavity of the first mold side 205 and approximately 50% of the polymer melt flows into the cavity of the second mold side 210. For example, the combined cavities of the first mold side 205 and the second mold side 210 can receive the polymer melt such that approximately 70% of the polymer melt flows into the cavity of the first mold side 205 and approximately 30% of the polymer melt flows into the cavity of the second mold side 210. It may be appreciated that other ratios of the sizes of the cavities can be contemplated and implemented based on the desired recess depth (described below) and final lens dimensions.

In a useful arrangement, the substrate 240 can be inserted in the first mold side 205 wherein the substrate 240 covers an area of the cavity surface 235 and abuts the sidewall 230 along a perimeter of the substrate 240. The substrate 240 can be a wafer, such as a pre-formed lens wafer having a laminate structure. For example, the substrate 240 can be similar to the wafer described above and include a PC and TPU sandwich structure with the TPU layer disposed in between the two outer PC layers. Non-limiting examples of other optical quality films that can take the place of the PC layers include cellulose triacetate, polyester, polyamide (nylon), cyclic olefin copolymer, acrylics (e.g., polymethylmethacrylate). Non-limiting examples of materials for the functional center layer can include adhesive, a thermoplastic elastomer, polyether-block-polyamides (PEBA), polyacrylates, polyacetals, polyureas, cellulose acetate propionate, cellulose acetate butyrate, polyvinyl alcohol, holographic photopolymers, uncured polymer-monomer blends, low molecular weight prepolymers, or any low-to-medium modulus material.

The substrate 240 can have several predetermined base curvatures, in one such example, the predetermined base curvature is based on a base curvature of the cavity surface 235, which can be either a zero mismatch or up to 2 diopters mismatch. The cavity surface 235 can take on a variety of predetermined shapes, such as spherical, progressive, bifocal, trifocal, and toric, among others. That is, the cavity surface 235 is shown as spherical but is not confined to only a spherical front or back surface. The cavity surface 235 of the first mold side 205 and the second mold side 210 can be formed to optimally receive the varying substrate 240 shapes inserted therein.

In such an arrangement, the substrate 240 can allow the injected polymer melt to form along an exposed surface of the substrate 240 on a side opposite the side facing the cavity surface 235, and prevent the polymer melt from leaking through the perimeter of the substrate 240 and flowing down and in between the substrate 240 and the cavity surface 235, or it can prevent the polymer melt from splitting apart any of the substrate 240 layers.

For the injection molding process, the substrate 240 can be recessed in the first mold side 205 and there can be a certain distance the polymer melt must travel between the gate 225 before reaching the substrate 240. This distance can be a recess depth of the substrate 240. Varying the recess depth of the substrate 240 can result in reduction of fabrication defects. In a useful arrangement, the recess depth of the substrate 240 can be adjusted by swapping (exchanging) mold inserts such that the first mold side 205 includes a deeper mold offset. It may be appreciated that multiple form factors for the first mold side 205 and the second mold side 210 can be fabricated for use with different substrates 240 with different thicknesses. Often, these are swapped without the intention of increasing the recess depth, but rather simply to maintain the commonly used recess depth for thicker substrates 240. Upon selection of a mold side having a mold offset too great, spacer shims can additionally be used and inserted behind the cavity surface 235 to adjust the recess depth.

In a useful arrangement, the first mold side 205 can include an adjustable cavity surface 250 (see FIG. 3D), wherein the cavity surface is translated to adjust the recess depth and/or the mold offset. The adjustable cavity surface 250 can be threaded into the first mold side 205 having threading on the sidewalls 230, wherein rotating the adjustable cavity surface 250 moves the adjustable cavity surface 250 along a direction of the sidewall 230. In a useful arrangement, the adjustable cavity surface 250 can be fit flush with the sidewall 230 of the first mold side 205, inserted through an opening disposed in the first mold side 205, and slidably translated along the direction of the sidewall 230 via, for example, a piston attached to the adjustable cavity surface 250 along a side opposite the cavity (that is, the side external to the first mold side 205 cavity). In any useful arrangement, the cavity surface (or adjustable cavity surface) of the second mold side 210 can be adjusted a concomitant amount to compensate for the shift of the substrate 240 in order to achieve the same desired thickness of the resulting lens.

Figure 3C:
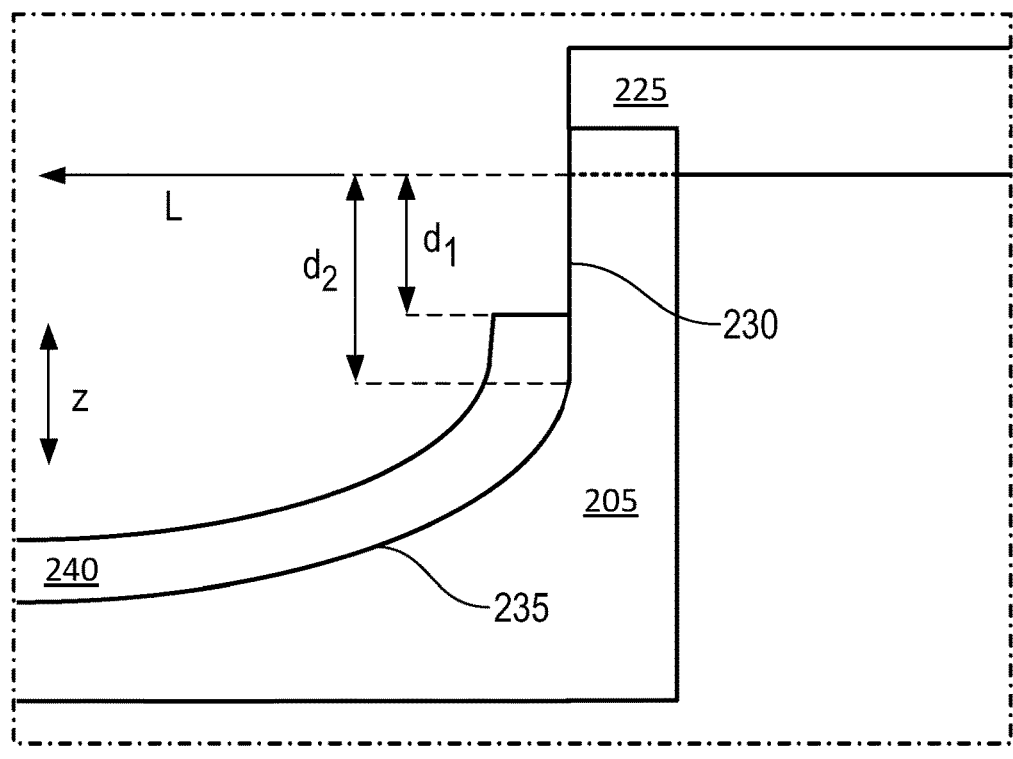
FIG. 3C shows a cross-sectional schematic of the first mold side, within the scope of the present disclosure.
Figure 3D:
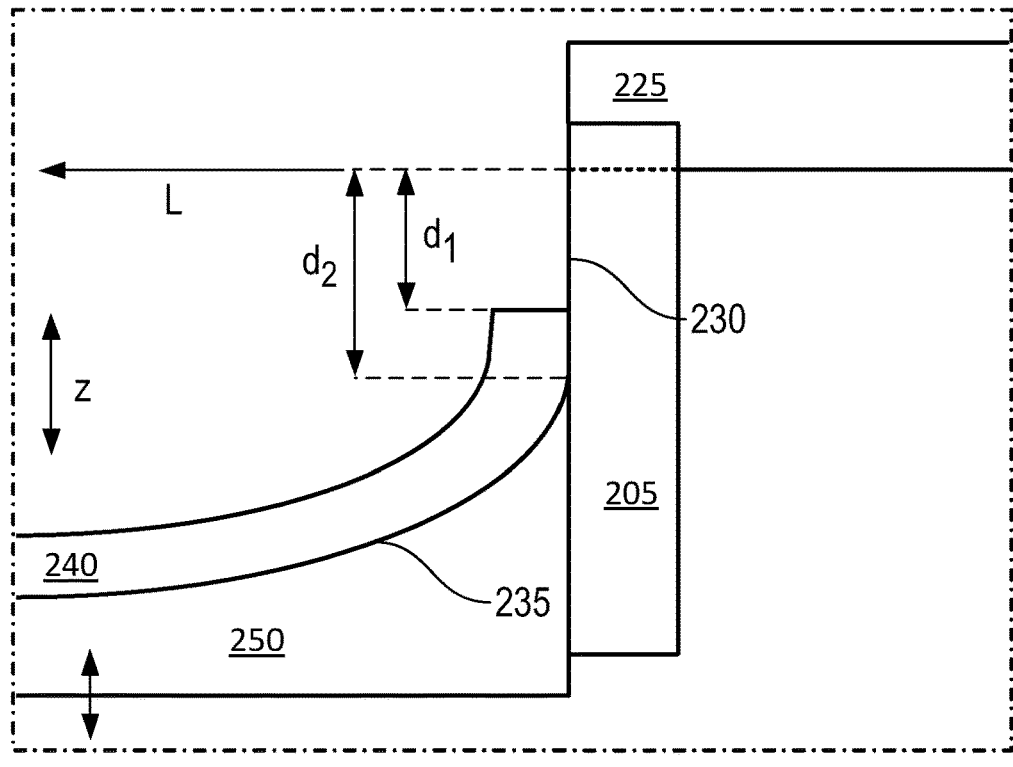
FIG. 3D shows a cross-sectional schematic of the first mold side including the adjustable cavity surface, within the scope of the present disclosure.

FIG. 3C shows a cross-sectional schematic of the first mold side 205, useful within the scope of the present disclosure. FIG. 3D shows a cross-sectional schematic of the first mold side 205 including the adjustable cavity surface 250, useful within the scope of the present disclosure. In a useful arrangement, the recess depth can be defined as a distance along the sidewall 230 between the bottom of the gate 225 and the exposed surface of the substrate 240 that is in a direction perpendicular to a lateral line (L) between the gate 225 and a middle of the exposed surface of the substrate 240. That is, the direction perpendicular to the lateral line (L) between the gate 225 and the middle of the exposed surface of the substrate 240 is in the z-direction. The recess depth is marked as "$d_1$" and the mold offset is marked as "$d_2$." As a reminder, the mold offset $d_2$ denotes the distance between the bottom of the gate 225 and the curved cavity surface 235. In particular, both the recess depth $d_1$ and the mold offset $d_2$ can be measured as the shortest distance to the nearest point on the substrate 240 and the cavity surface 235, respectively.

The bottom of the gate 225 and a top of the sidewall 230 can be at distinct distances from the exposed surface of the substrate 240, such as in the illustrated arrangement wherein the gate 225 is formed as part of the sidewall 230. In other useful arrangements, the bottom of the gate 225 can be flush with the top of the sidewall 230 or disposed further above the top of the sidewall 230. As previously mentioned, the cavity surface 235 of FIG. 3C can be adjusted by swapping the first mold side 205 for one with a greater mold offset $d_2$ to yield the desired recessed depth $d_1$. Similarly, the adjustable cavity surface 250 of FIG. 3D can be adjusted along the z-direction to increase the mold offset $d_2$ to yield the desired increased recess depth $d_1$. The cavity surface 235 can also be recessed based on a thickness of the substrate 240 inserted in the first mold side 205.

Described herein is a relationship between changes in the recess depth $d_1$ and the severity and magnitude of the delamination defect that occurs near the gate 225. Optimization of the recess depth $d_1$ can help alleviate the in-situ delamination of the substrate 240, the material of which is often of low modulus and comprises soft elastomeric material layers, by reducing the shear stresses and strain experienced on the leading edge of the substrate 240 (nearest the gate 225) by the injected polymer melt entering the cavity of the coupled first mold side 205 and the second mold side 210. The examples described herein will demonstrate setting the recess depth $d_1$ of the substrate 240 in the first mold side 205 to be 2 mm or greater results in a significant decrease in the occurrence of the delamination defect due to a concomitant decrease in the shear stress measured along the sidewall 230 of the mold 200 at or near the gate 225.

EXAMPLES

Example 1—To improve the rigidity of the TPU layer after thermoforming (TF) to a base curve slightly below the base curve of the cavity surface 235, the substrates 240 were post-cured between 2.5-5 hours at 120° ° C. using standard oven conditions. This approach worked well for the low to mid (2.25D and 4.25D) base lenses, but the higher base (6.50D) lenses showed sporadic delamination of the substrate 240 at the gate 225. Roughly 25% of the molded 6.50D base lenses showed this defect even after the post-curing process. Thus, adjusting the recess depth $d_1$ was interrogated.

A 3-ply laminate (i.e. the substrate 240) was used including 18% solids with 5% additive (72% THF, 10% ethyl acetate). Vacuum drying was performed before thermoforming of the substrate 240 at 60° C. for 24 hours. After thermoforming, a post-curing process of the substrate 240 was performed at 120° ° C. for 2.5 to 5 hours. Before injection molding, a standard drying process was executed at 82° C. for 12 hours on the substrate 240. The varying recess depths $d_1$ in the first mold side 205 were measured for the substrate 240 having base curvatures ranging from 2.25D to 6.50D.

TABLE 1

| Insert Setup and Root Cause Results | | | |
| --- | --- | --- | --- |
| Recess Depth | Base Curvature | Gate Defect | Notable Metrics |
| 2.0 mm | 2.25D | YES | 51/60 lens defect free |
| 1.9 mm | 4.25D | YES | 31/45 lens defect free |
| 2.5 mm | 4.25D | NO | No defects detected |
| 1.8 mm | 6.50D | YES | 73/100 lens defect free |
| 2.8 mm | 6.50D | NO | No defects detected |

Notably, 30 consecutive attempts at injection molding for the 6.50D substrate 240 were performed with the 2.8 mm recess depth $d_1$ that resulted in zero lenses with defects.

An analysis of the rheological behavior of the PC melt was carried out using Mold Flow Insight software, wherein the exact processing conditions and variables used for injection molding were imported for simulation. This provided a better understanding of the relationship between the PC-TPU based substrate 240 and the recess depth $d_1$. The results are shown in FIGS. 4A and 4B.

Figure 4A:
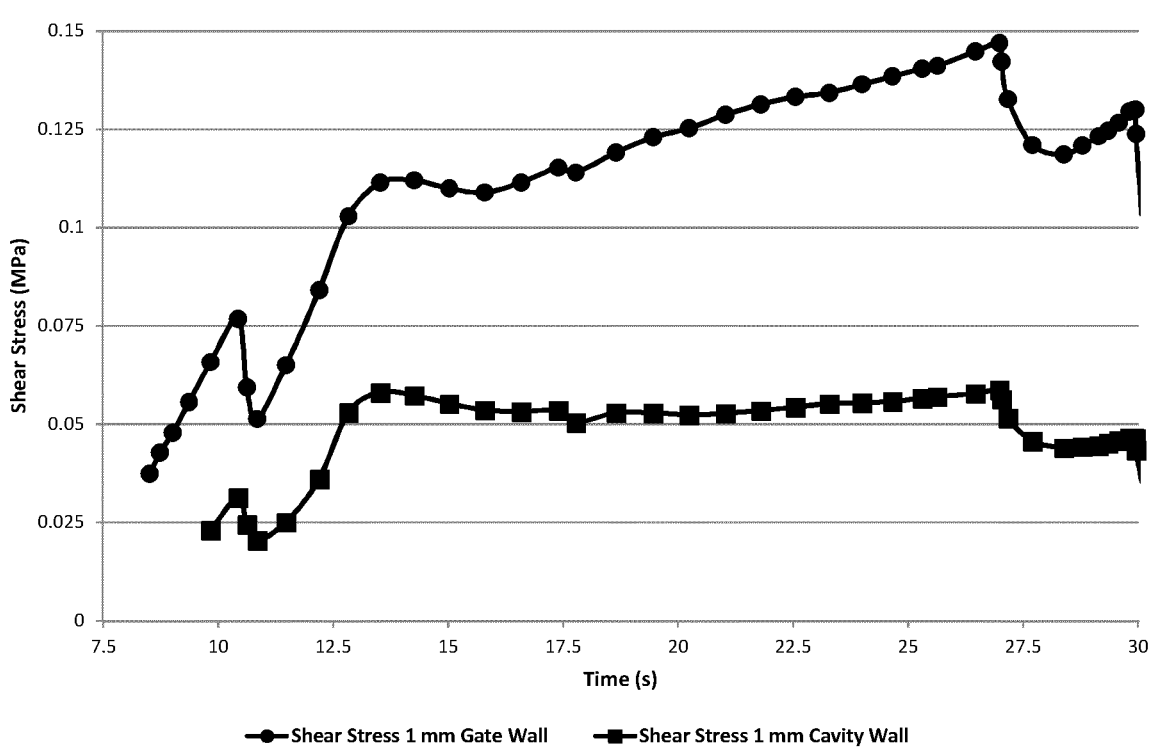
FIG. 4A is a graph of the shear stress measured in the mold with a recess depth of 1 mm over time, within the scope of the present disclosure.

FIG. 4A is a graph of the shear stress measured in the mold 200 with a recess depth $d_1$ of 1 mm over time, useful within the scope of the present disclosure. The graph displays the relationship between the injection fill time of the polymer melt from the sprue 215 through the end of fill (EOF) as a function of shear stress at two locations along the sidewall 230 and the gate 225. The flow behavior of the polymer melt starting from time scales of 0 to 7 seconds were ignored for the purposes of this analysis, since the polymer melt approaches the gate 225 and cavity approximately after 8 seconds. The results acquired through the simulation demonstrated that high shear stresses are imparted onto the substrate 240 by the polymer melt in the event of the recess depth $d_1$ being shallow. In particular, the shear stress measured at the sidewall 230 (denoted by the square-shaped points) exceeds 0.05 MPa, especially during the beginning of the injection of the polymer melt where a first peak is observed.

Figure 4B:
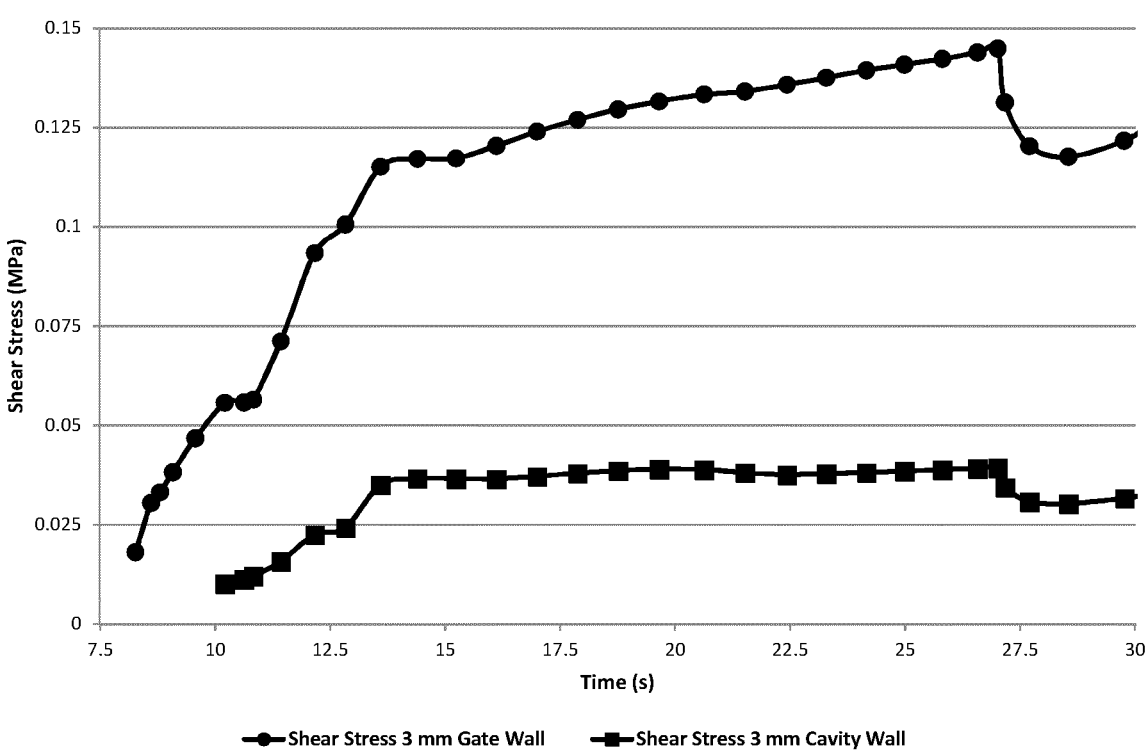
FIG. 4B is a graph of the shear stress measured in the mold with a recess depth of 3 mm over time, within the scope of the present disclosure.

FIG. 4B is a graph of the shear stress measured in the mold 200 with a recess depth $d_1$ of 3 mm over time, useful within the scope of the present disclosure. The results acquired through the simulation demonstrated lower shear stresses imparted onto the substrate 240 by the polymer melt in the event of the recess depth $d_1$ being deeper. In particular, the shear stress measured at the sidewall 230 (again denoted by the square-shaped points) does not exceed 0.04 MPa, with the highest shear stress measured being 0.39 MPa at an injection time of 27 seconds. Furthermore, an initial spike of shear stress in the beginning of the injection is eliminated, potentially leading to even less likelihood of delamination of the substrate 240.

Example 2—A recess depth $d_1$ of approximately 2.5 mm was used for additional over molding. Approximately 400 lenses were fabricated across four molds 200 (100 injections of the polymer melt per each of the mold 200) resulting in 400 defect-free lenses.

Figure 5A:
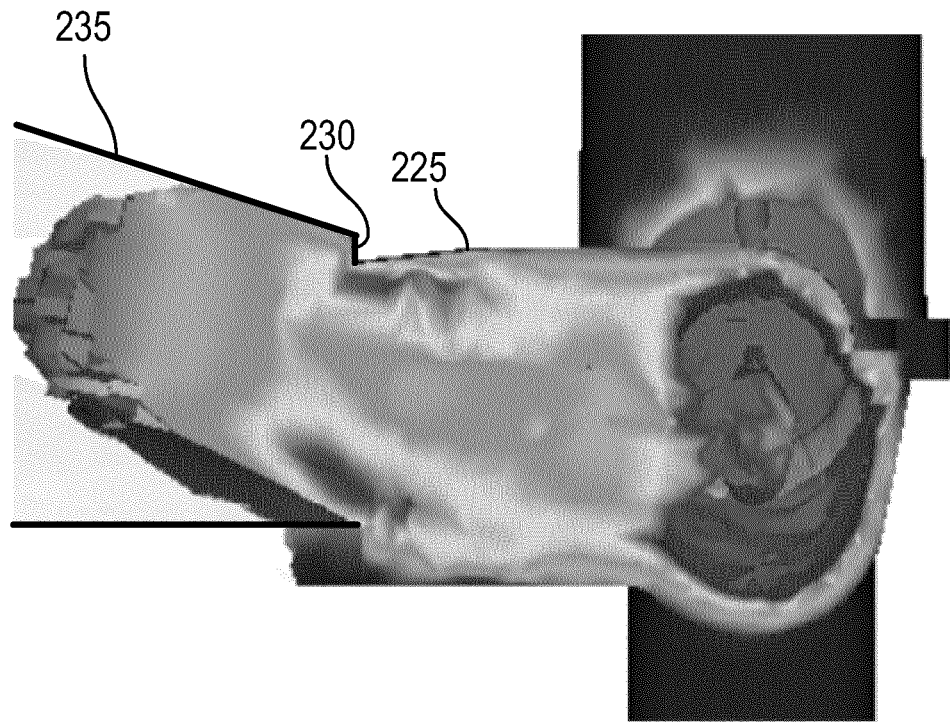
FIG. 5A is a model cross-section view of the mold during injection molding demonstrating simulated shear stress measurements for a 1 mm recess depth, within the scope of the present disclosure.
Figure 5B:
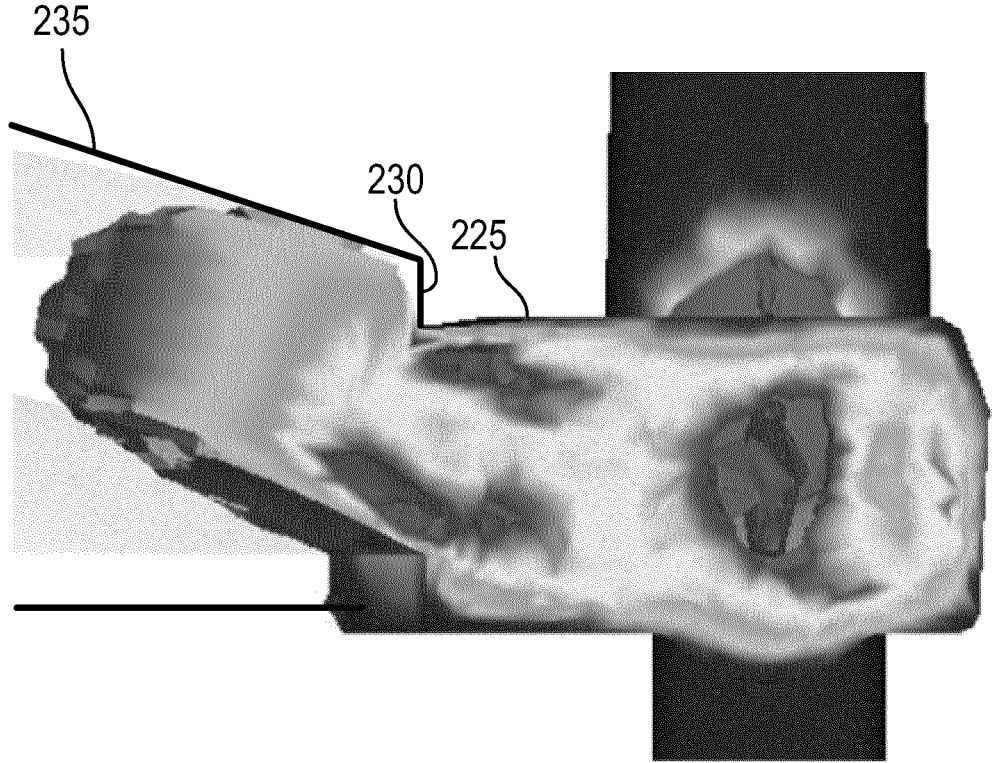
FIG. 5B is a model cross-section view of the mold during injection molding demonstrating simulated shear stress measurements for a 3 mm recess depth, within the scope of the present disclosure.

FIG. 5A is a model cross-section view of the mold 200 during injection molding demonstrating simulated shear stress measurements for a 1 mm recess depth $d_1$, useful within the scope of the present disclosure. FIG. 5B is a model cross-section view of the mold 200 during injection molding demonstrating simulated shear stress measurements for a 3 mm recess depth $d_1$, useful within the scope of the present disclosure. FIGS. 5A and 5B, both shown upside-down, compare two shear stress profiles for two different recess depths $d_1$ (1 mm vs 3 mm) at the gate 225 and the sidewall 230. The shear stress in the cavity at the sidewall 230 for the 1 mm recess depth is much higher than the 3 mm recess depth on average. The two simulations also demonstrate the increase in the difference (delta) between the shear stress ($\tau$) at the gate 225 ($\tau$_gate, rel max) and the sidewall 230 ($\tau$_sidewall, abs max). This relationship implies that even though increasing the recess depth $d_1$ increases the shear stresses within the gate 225, the step change from the gate 225 into the cavity allows the high shear experienced by the polymer melt to be minimized prior to it entering into the cavity and contacting the substrate 240.

Table 2 below also describes the decrease in shear stress at the sidewall 230 as a function of increasing the recess depth $d_1$ from 1 to 4 mm. Furthermore, it also demonstrates the delta of the shear stress ($\Delta\tau$_drop) increasing with recess depth $d_1$ increase, which correlates with the behavior observed in FIGS. 5A and 5B. The values shown in Table 2 represent the shear stress values at approximately 13 seconds into the injection molding process (i.e. the filling of the cavity). This is an important step because at this particular point in time the shear stress within the cavity reaches its absolute maximum regardless of the change in the recess depth $d_1$.

TABLE 2

| Rheological Properties of PC Melt with Varying Recess Depths | | | |
|---|---|---|---|
| Recess Depth | $\tau_{sidewall,\,abs\,max}$ (MPa) | $\tau_{gate,\,rel\,max}$ (MPa) | $\Delta\tau_{drop}$ |
| 1 mm | 0.063 | 0.121 | 47.9% |
| 2 mm | 0.046 | 0.120 | 61.7% |
| 3 mm | 0.035 | 0.122 | 71.3% |
| 4 mm | 0.031 | 0.125 | 75.2% |

Figure 6A:
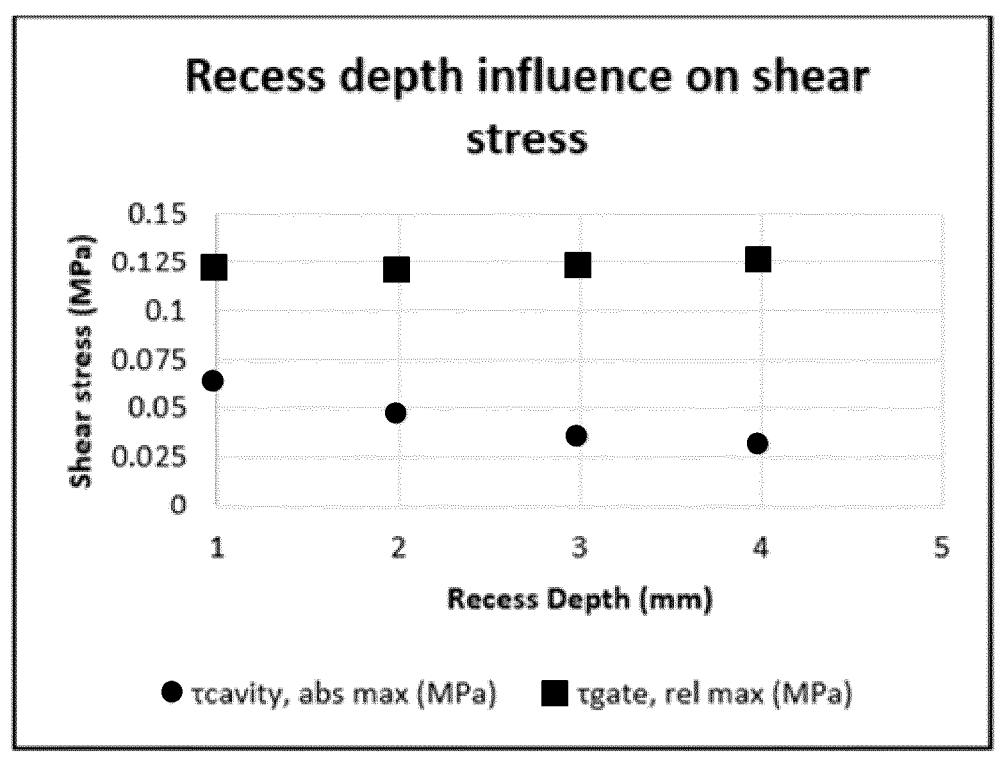
FIGS. 6A-6B are graphic representations of the values listed in Table 2, within the scope of the present disclosure.
Figure 6B:
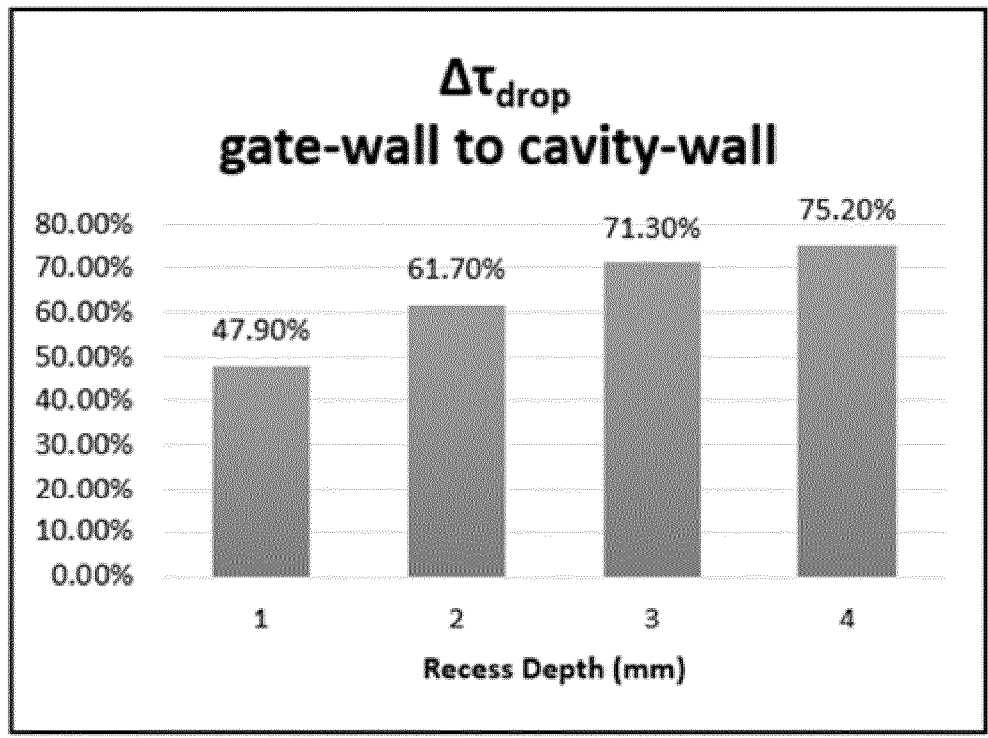

FIGS. 6A and 6B are graphic representations of the values listed in Table 2, useful within the scope of the present disclosure. FIG. 6A shows a minor rise in shear stress within the gate 225 (denoted by the square-shaped points) as the recess depth $d_1$ is increased. The rise in shear stress within the gate 225 can be attributed to a change in the geometry of the opening of the gate 225, which is being shifted vertically away from the cavity surface 235 side, and more towards the core side (that is, towards the second mold side 210). This change in position of the gate 225 creates a slight hesitation and restriction of the polymer melt as it enters the gate 225, increasing both the shear stress, shear rate and pressure drop within the gate 225. In contrast to the rising behavior of shear stress at the gate 225 with the recess depth $d_1$, shear stress decreases at the sidewall 230 with increasing recess depth $d_1$. This is depicted by the circular-shaped dots shown in FIG. 6A. This inverse relationship is the key to resolving the issue of delamination of the substrate 240 (i.e. wafer delamination) during injection molding. As the recess depth $d_1$ is increased, the degree of shear stress imparted on the substrate 240 is reduced in an almost linear manner. That is, the method, apparatus, and examples described herein demonstrate how injection over molding molds were adjusted by increasing the recess depth $d_1$ of the first mold side 205, while the second mold side 210 recess depth was concomitantly decreased to maintain constant final lens thickness so that the initial polymer melt front, as it enters the cavity at the gate 225, reaches the leading edge of the substrate 240 at a lower velocity (i.e., lower shear stress and shear rate), pins the substrate 240 to the first mold side 205, and prevents delamination from occurring.

Figure 7:
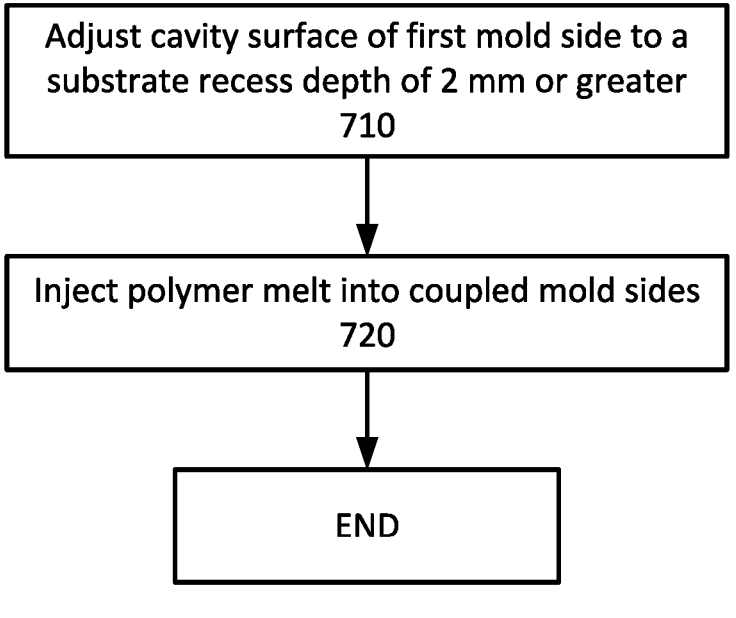
FIG. 7 is an exemplary flow chart for a method of forming a lens, within the scope of the present disclosure.

FIG. 7 is an exemplary flow chart for a method 700 of forming a lens, useful within the scope of the present disclosure. In a useful configuration, at step 710 the cavity surface 235 of the first mold side 205 is adjusted, the cavity surface 235 being adjusted to a substrate recess depth $d_1$ of 2 mm or greater. At step 720, the polymer melt is injected into the coupled first mold side 205 and the second mold side 210 via the gate 225, the substrate 240 inserted therein having a recess depth $d_1$ of 2 mm or greater.

The disclosure provides many different variations, or examples, for implementing different features of the provided subject matter. Specific examples of components and arrangements are described below to simplify the present disclosure. These are, of course, merely examples and are not intended to be limiting nor inoperable together in any permutation. Unless indicated otherwise, the features and embodiments described herein are operable together in any permutation. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. Inventive apparatuses may be otherwise oriented (rotated 90 degrees or at other orientations) and the spatially relative descriptors used herein may likewise be interpreted accordingly.

The order of discussion of the different steps as described herein has been presented for clarity's sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present disclosure can be embodied and viewed in many different ways.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than specifically described unless expressly indicated otherwise. Various additional operations may be performed and/or described operations may be omitted.

Those skilled in the art will also understand that there can be many variations made to the operations of the techniques explained above while still achieving the same objectives of the disclosure. Such variations are intended to be covered by the scope of this disclosure. As such, the foregoing descriptions of embodiments are not intended to be limiting. Rather, any limitations to embodiments are presented in the following claims.

Embodiments of the present disclosure may also be as set forth in the following parentheticals.

(1) A mold device, comprising: a first mold side (205) configured to receive a substrate (240) in a cavity and to couple with a second mold side (210), the first mold side (205) including a sidewall (230) and a gate (225), wherein the substrate (240) is recessed in the first mold side (205) at a substrate (240) recess depth of 2 mm or greater, and wherein the substrate (240) recess depth is a distance along the sidewall (230) between a bottom of the gate (225) and a surface of the substrate (240) in a direction perpendicular to a line between the gate (225) and a middle of the surface of the substrate (240), and wherein the bottom of the gate (225) and a top of the sidewall (230) are at distinct heights from the surface of the substrate (240).

(2) The device of (1), wherein the first mold side (205) includes a cavity surface (235), the cavity surface (235) having a predetermined base curvature, the predetermined base curvature being based on a base curvature of the substrate (240), the cavity surface (235) being recessed a predetermined mold offset depth, the predetermined mold offset depth being based on a thickness of the substrate (240) inserted in the first mold side (205).

(3) The device of either (1) or (2), wherein the first mold side (205) includes an adjustable cavity surface (250) configured to translate along a direction parallel to the substrate (240) recess depth to adjust a mold offset depth, the mold offset depth is a distance along the sidewall (230) between the bottom of the gate (225) and the cavity surface (235).

(4) The device of either (2) or (3), wherein the adjustable cavity surface (250) includes a predetermined base curvature, the predetermined base curvature being based on a base curvature of the substrate (240).

(5) The device of any one of (1) to (4), wherein the substrate (240) recess depth is greater than 2 mm, or greater than 2.5 mm, or greater than 2.8 mm.

(6) The device of any one of (1) to (5), wherein the substrate (240) recess depth is 3 mm or greater.

(7) The device of any one of (1) to (6), wherein the substrate (240) recess depth results in a maximum shear stress along the sidewall (230) adjacent to the gate (225) of less than 0.055 MPa, or less than 0.05 MPa, or less than 0.045 MPa, or less than 0.04 MPa.

(8) The device of any one of (1) to (7), wherein the gate (225) is at least partially integrated into the sidewall (230) of the first mold side (205).

(9) The device of any one of (1) to (8), wherein the second mold side (210) includes a second mold cavity surface (235) recessed a predetermined second mold side (210) offset depth, the predetermined second mold side (210) offset depth being equal to the substrate (240) recess depth of the first mold side (205).

(10) The device of any one of (1) to (9), wherein a material of the substrate (240) is at least one of a thermoplastic elastomer, a thermoplastic polyurethane, an adhesive, polyether-block-polyamides (PEBA), polyacrylates, polyacetals, polyureas, cellulose acetate propionate, cellulose acetate butyrate, polyvinyl alcohol, holographic photopolymers, uncured polymer-monomer blends, and low molecular weight prepolymers.

(11) A method of forming a lens, comprising: adjusting a cavity surface (235) of a first mold side (205), the first mold side (205) configured to couple with a second mold side (210), the first mold side (205) including a cavity, a sidewall (230), and a gate (225), the cavity surface (235) being adjusted to a substrate (240) recess depth of 2 mm or greater, the substrate (240) recess depth being a distance along the sidewall (230) between a bottom of the gate (225) and a surface of a substrate (240) in a direction perpendicular to a line between the gate (225) and a middle of the surface of the substrate (240), the bottom of the gate (225) and a top of the sidewall (230) being at distinct distances from the surface of the substrate (240); and injecting a polymer into the coupled first mold side (205) and second mold side (210) via the gate (225).

(12) The method of (11), wherein the substrate (240) recess depth of the cavity surface (235) is adjusted to be greater than 2 mm, or greater than 2.5 mm, or greater than 2.8 mm.

(13) The method of either (11) or (12), wherein the substrate (240) recess depth of the cavity surface (235) is adjusted to be 3 mm or greater.

(14) The method of any one of (11) to (13), wherein injecting the polymer results in a maximum shear stress of less than 0.055 MPa, or less than 0.05 MPa, or less than 0.045 MPa, or less than 0.04 MPa along the sidewall (230) adjacent to the gate (225).

(15) The method of any one of (11) to (14), further comprising adjusting a cavity surface (235) of the second mold side (210) to a predetermined second mold side (210) offset depth, the predetermined second mold side (210) offset depth being equal to the substrate (240) recess depth of the first mold side (205).

(16) A method of forming a lens using the mold device of any one of (1) to (10), comprising: inserting the substrate (240) into the cavity of the first mold side (205); determining the substrate (240) recess depth; adjusting the cavity surface (235) of the first mold side (205) to make the substrate (240) recess depth 2 mm or greater: and injecting a polymer into the coupled first mold side (205) and the second mold side (210).

What is claimed is:

1. A mold device, comprising:
a first mold side configured to receive a substrate in a cavity and to couple with a second mold side, the first mold side including a sidewall and a gate,
wherein the substrate is recessed in the first mold side at a substrate recess depth of 2 mm or greater, and
wherein the substrate recess depth is a distance along the sidewall between a bottom of the gate and a surface of the substrate in a direction perpendicular to a line between the gate and a middle of the surface of the substrate, and
wherein the bottom of the gate and a top of the sidewall are at distinct heights from the surface of the substrate.

2. The mold device of claim 1, wherein the first mold side includes a cavity surface, the cavity surface having a predetermined base curvature, the predetermined base curvature being based on a base curvature of the substrate, the cavity surface being recessed a predetermined mold offset depth, the predetermined mold offset depth being based on a thickness of the substrate inserted in the first mold side.

3. The mold device of claim 1, wherein the first mold side includes an adjustable cavity surface configured to translate along a direction parallel to the substrate recess depth to adjust a mold offset depth, the mold offset depth is a distance along the sidewall between the bottom of the gate and the cavity surface.

4. The mold device of claim 3, wherein the adjustable cavity surface includes a predetermined base curvature, the predetermined base curvature being based on a base curvature of the substrate.

5. The mold device of claim 1, wherein the substrate recess depth is 2.5 mm or greater.

6. The mold device of claim 1, wherein the substrate recess depth is 3 mm or greater.

7. The mold device of claim 1, wherein the substrate recess depth results in a maximum shear stress along the sidewall adjacent to the gate of less than 0.055 MPa.

8. The mold device of claim 1, wherein the gate is at least partially integrated into the sidewall of the first mold side.

9. The mold device of claim 1, wherein the second mold side includes a second mold cavity surface recessed a predetermined second mold side offset depth, the predetermined second mold side offset depth being equal to the substrate recess depth of the first mold side.

10. A method of forming a lens, comprising:

adjusting a cavity surface of a first mold side, the first mold side configured to couple with a second mold side, the first mold side including a cavity, a sidewall, and a gate, the cavity surface being adjusted to a substrate recess depth of 2 mm or greater, the substrate recess depth being a distance along the sidewall between a bottom of the gate and a surface of a substrate in a direction perpendicular to a line between the gate and a middle of the surface of the substrate, the bottom of the gate and a top of the sidewall being at distinct distances from the surface of the substrate; and injecting a polymer into the coupled first mold side and second mold side via the gate.

11. The method of claim 10, wherein the substrate recess depth of the cavity surface is adjusted to be 2.5 mm or greater.

12. The method of claim 10, wherein the substrate recess depth of the cavity surface is adjusted to be 3 mm or greater.

13. The method of claim 10, wherein injecting the polymer results in a maximum shear stress of less than 0.055 MPa along the sidewall adjacent to the gate.

14. The method of claim 10, further comprising adjusting a cavity surface of the second mold side to a predetermined second mold side offset depth, the predetermined second mold side offset depth being equal to the substrate recess depth of the first mold side.

* * * * *